(12) United States Patent
Connor

(10) Patent No.: US 8,098,676 B2
(45) Date of Patent: Jan. 17, 2012

(54) TECHNIQUES TO UTILIZE QUEUES FOR NETWORK INTERFACE DEVICES

(75) Inventor: Patrick L. Connor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1357 days.

(21) Appl. No.: 10/917,728

(22) Filed: Aug. 12, 2004

(65) Prior Publication Data
US 2006/0034310 A1    Feb. 16, 2006

(51) Int. Cl.
*H04L 12/28*    (2006.01)
(52) U.S. Cl. ........................ 370/419; 711/159
(58) Field of Classification Search .............. 370/401, 370/419; 709/250; 711/158–159
See application file for complete search history.

(56) References Cited

U.S. PATENT DOCUMENTS

| | | | |
|---|---|---|---|
| 5,243,699 A * | 9/1993 | Nickolls et al. ............. | 712/11 |
| 5,296,935 A * | 3/1994 | Bresler ..................... | 358/406 |
| 5,781,549 A * | 7/1998 | Dai ........................ | 370/398 |
| 6,687,905 B1 * | 2/2004 | Day et al. .................. | 718/102 |
| 6,804,241 B2 * | 10/2004 | Schwartz et al. ........... | 370/392 |
| 6,981,074 B2 * | 12/2005 | Oner et al. ................. | 710/32 |
| 7,039,061 B2 * | 5/2006 | Connor et al. .............. | 370/429 |
| 2002/0110136 A1 * | 8/2002 | Wakai et al. .............. | 370/419 |
| 2002/0147851 A1 * | 10/2002 | Morimura et al. .......... | 709/249 |
| 2003/0065889 A1 * | 4/2003 | Kamitani et al. ........... | 711/137 |
| 2003/0093645 A1 * | 5/2003 | Wong et al. ............... | 711/216 |
| 2003/0126233 A1 * | 7/2003 | Bryers et al. .............. | 709/219 |
| 2003/0227937 A1 * | 12/2003 | Abrol et al. ............... | 370/457 |
| 2003/0236815 A1 * | 12/2003 | Brenner et al. ............ | 709/104 |
| 2004/0151176 A1 * | 8/2004 | Burton et al. .............. | 370/389 |
| 2004/0151177 A1 * | 8/2004 | Burton et al. .............. | 370/389 |
| 2004/0208174 A1 * | 10/2004 | Burton et al. .............. | 370/386 |
| 2004/0213284 A1 * | 10/2004 | Clarke et al. .............. | 370/465 |
| 2005/0060445 A1 * | 3/2005 | Beukema et al. ........... | 710/52 |

OTHER PUBLICATIONS

Cornett, Linden, "Techniques for Providing Scalable Receive Queues", U.S. Appl. No. 10/839,923, 31 pages including figures (filed May 5, 2004).

Microsoft Corporation, "Scalable Networking: Eliminating the Receive Processing Bottleneck—Introducing RSS", WinHEC 2004 Version, 17 pages, located at http://www.microsoft.com/whdc/device/network/NDIS_RSS.mspx (Apr. 14, 2004).

Information Sciences Institute, "Transmission Control Protocol: DARPA Internet Program Protocol Specification", RFC: 793, 89 pages, located at http://www.ibiblio.org/pub/docs/rfc/rfc793.txt (Sep. 1981).

IEEE, "Amendment to Carrier Sense Multiple Access with Collision Detection (CSMA/CD) Access Method and Physical Layer Specifications—Aggregation of Multiple Link Segments", IEEE Std 802.3ad-2000, ISBN 0-7381-2472-9, 183 pages (Mar. 30, 2000).

* cited by examiner

*Primary Examiner* — Ayaz Sheikh
*Assistant Examiner* — Mounir Moutaouakil
(74) *Attorney, Agent, or Firm* — Caven & Aghevli LLC

(57) ABSTRACT

Techniques to allocate packets for processing among multiple processor(s). In an embodiment, capability to receive packets from a plurality of network interfaces may be provided, where each of the network interfaces is associated with at least one receive queue. the plurality of network interfaces may use any of the receive queues. Packet processing may be performed among a plurality of processors. Other embodiments are also disclosed.

25 Claims, 5 Drawing Sheets

TECHNIQUES TO UTILIZE QUEUES FOR NETWORK INTERFACE DEVICES

RELATED ART

Network-based communications between computers are increasing in speed. Advances in network speeds, however, have not been fully utilized due to latency that may be associated with processing protocol stacks at computers. Receive side scaling (RSS) is a feature in operating systems that allows network interface devices that support RSS to direct packets of certain Transmission Control Protocol/Internet Protocol (TCP/IP) flows to be processed on a designated Central Processing Unit (CPU). The RSS feature scales the received traffic across multiple processors in order to avoid limiting the receive bandwidth to the processing capabilities of a single processor.

BRIEF DESCRIPTION OF THE DRAWINGS

Note that use of the same reference numbers in different figures indicates the same or like elements.

DETAILED DESCRIPTION

Figure 1:
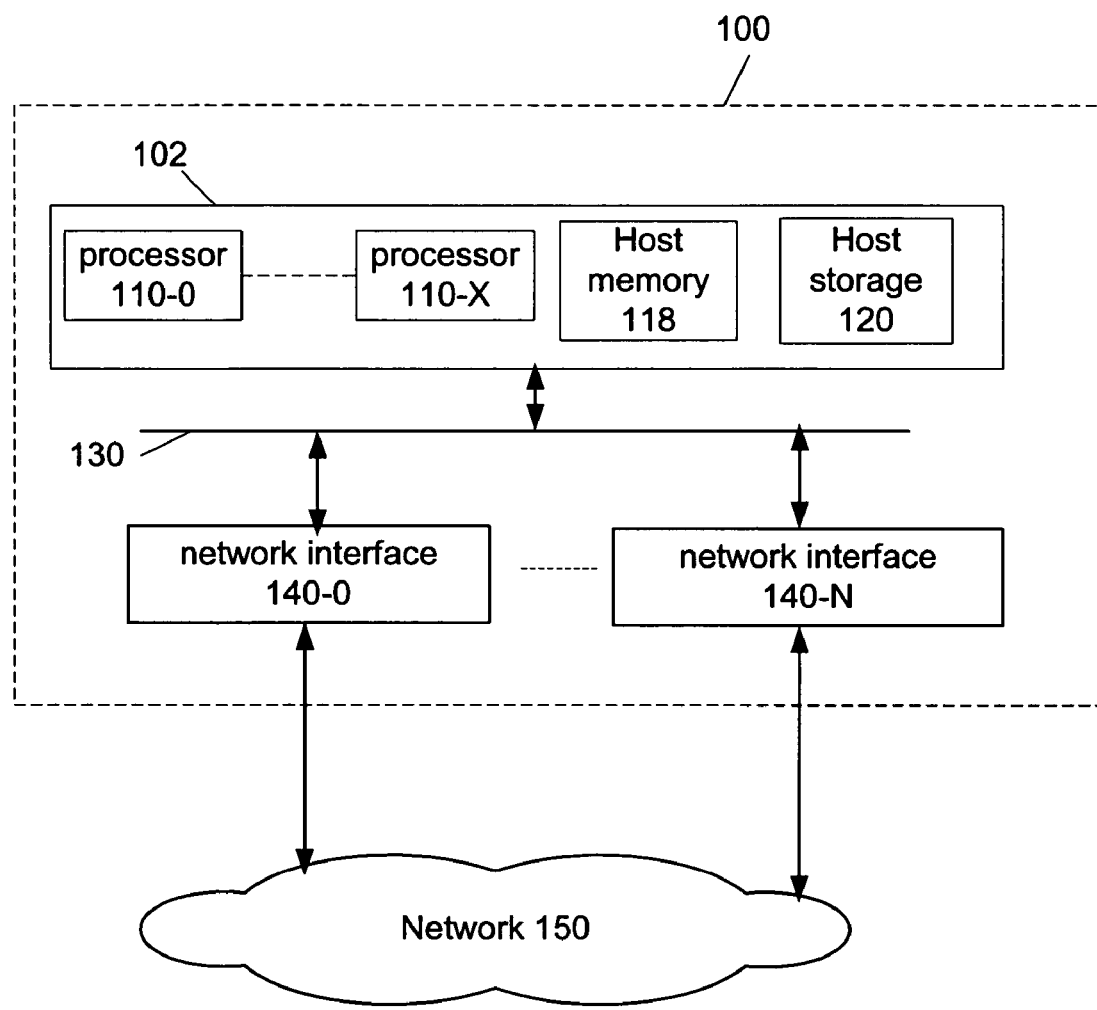
FIG. 1 depicts an example computer system that can use embodiments of the present invention.

FIG. 1 depicts an example computer system 100 that can use embodiments of the present invention. Computer system 100 may include host system 102, bus 130, and multiple network interfaces 140-0 to 140-N. Host system 102, bus 130, and multiple network interfaces 140-0 to 140-N may intercommunicate using a single circuit board, such as, for example, a system motherboard.

Host system 102 may include multiple processing units (processor 110-0 to processor 110-N), host memory 118, and host storage 120. Each of processors 110-0 to 110-N may be implemented as Complex Instruction Set Computer (CISC) or Reduced Instruction Set Computer (RISC) processors, multi-core, or any other type of processor. Host memory 118 may be implemented as a volatile memory device (e.g., RAM, DRAM, or SRAM). Host storage 120 may be implemented as a magnetic disk drive, optical disk drive, tape drive, an internal storage device, an attached storage device, a network accessible storage device, and/or any type of non-volatile storage device. Routines and information stored in host storage 120 may be loaded into host memory 118 and executed by the one or more processors.

Processors 110-0 to 110-N may be communicatively coupled to a chipset (not depicted). The chipset may include a host bridge/hub system that may provide intercommunication among processors 110-0 to 110-N, host memory 118, and bus 130. The chipset may also include an I/O bridge/hub system (not shown) that may couple the host bridge/bus system to bus 130. The chipset may include one or more integrated circuit chips, such as those selected from integrated circuit chipsets (e.g., graphics memory and I/O controller hub chipsets), although other one or more integrated circuit chips may also, or alternatively, be used.

Bus 130 may provide intercommunication between host system 102 and network interfaces 140-0 to 140-N. Bus 130 may be compatible with Peripheral Component Interconnect (PCI) described for example at Peripheral Component Interconnect (PCI) Local Bus Specification, Revision 2.2, Dec. 18, 1998 available from the PCI Special Interest Group, Portland, Oreg., U.S.A. (as well as revisions thereof); PCI Express described in The PCI Express Base Specification of the PCI Special Interest Group, Revision 1.0a (as well as revisions thereof); PCI-x described in the PCI-X Specification Rev. 1.0a, Jul. 24, 2000, available from the aforesaid PCI Special Interest Group, Portland, Oreg., U.S.A. (as well as revisions thereof); serial ATA described for example at "Serial ATA: High Speed Serialized AT Attachment," Revision 1.0, published on Aug. 29, 2001 by the Serial ATA Working Group (as well as related standards); Universal Serial Bus (USB) (and related standards) or other interconnection technologies.

Computer system 100 may utilize network interfaces 140-0 to 140-N to intercommunicate with network 150. Network 150 may be any network such as the Internet, an intranet, a local area network (LAN), storage area network (SAN), a wide area network (WAN), or wireless network. Network 150 may exchange traffic with computer system 100 using the Ethernet standard (described in IEEE standard 802.3 (2002) and related standards) or any communications standard.

Figure 2:
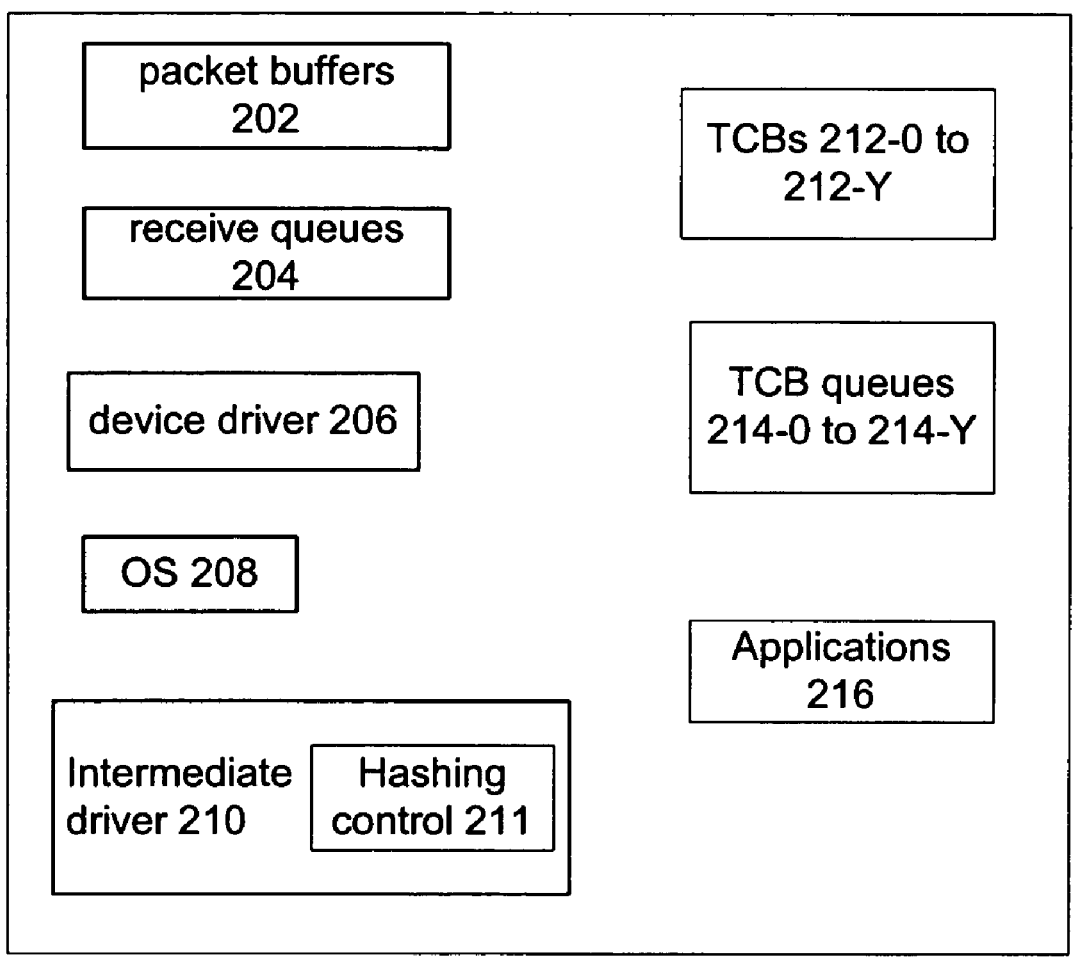
FIG. 2 depicts an example of machine-executable instructions capable of being executed, and/or data capable of being accessed, operated upon, and/or manipulated, in accordance with an embodiment of the present invention.

FIG. 2 depicts an example of machine-executable instructions capable of being executed, and/or data capable of being accessed, operated upon, and/or manipulated and that may be stored in host memory 118, in accordance with an embodiment of the present invention. In this example, host memory 118 may store packet buffers 202, receive queues 204, device driver 206, operating system (OS) 208, intermediate driver 210, TCBs 212-0 to 212-Y, TCB queues 214-0 to 214-Y, and applications 216.

Packet buffer 202 may include multiple buffers and each buffer may store at least one ingress packet received from a network (such as network 150). Packet buffer 202 may store packets received by network interfaces 140-0 to 140-N that are queued for processing at least by device driver 206, operating system 208, intermediate driver 210, TCBs 212-0 to 212-Y, and/or applications 216.

Receive queues 204 may include input queues and output queues. Input queues may be used to transfer descriptors from host system 102 to one or more of network interfaces 140-0 to 140-N. A descriptor may be transferred to a single network interface. A descriptor may describe a location within a buffer and length of the buffer that is available to store an ingress packet. Output queues may be used to transfer return descriptors from any of network interfaces 140-0 to 140-N to host system 102. A return descriptor may describe the buffer in which a particular ingress packet is stored within packet buffer 202 and identify features of the packet such as the length of the ingress packet, hash values and packet types, and checksum pass/fail. In one embodiment, receive queues 204 may include multiple input and multiple output queues. In one embodiment, where there are multiple network interfaces 140-0 to 140-N, intermediate driver 210 may allocate the receive queues associated with each of network interfaces 140-0 to 140-N for use by any of the network interfaces 140-0 to 140-N.

Device driver 206 may be device drivers for each of network interfaces 140-0 to 140-N. Although not depicted, in one embodiment, there may be a separate device driver for each of the multiple network interfaces. Device driver 206 may create descriptors and may manage the use and allocation of descriptors in receive queue 204. Device driver 206 may request transfer of descriptors to network interfaces 140-0 to 140-N using one or more input queues. Device driver 206 may signal to one of network interfaces 140-0 to 140-N that a descriptor is available on an input queue. Device driver 206 may determine the location of the ingress packet in packet buffer 202 based on a return descriptor that describes such ingress packet and device driver 206 may inform operating system 208 (as well as other routines and tasks) of the availability and location of such stored ingress packet.

In one embodiment, OS 208 may be any operating system that supports steering of packet processing across multiple processors such as, but not limited to, receive side scaling (RSS). For example, OS 208 may be implemented using Microsoft Windows, HP-UX, Linux, or UNIX, although other operating systems may be used. Some embodiments of RSS permit network interfaces with multiple receive queues to direct packets of a given TCP flow to a specific queue so that packets in each specific queue will be processed by a specific processor. In one embodiment, OS 208 may be executed by each of the processors 110-0 to 110-N. In one embodiment, when a Microsoft Windows operating system is used, the ndis.sys driver may be utilized at least by device driver 206 and intermediate driver 210. For example, the ndis.sys driver may be utilized to define application programming interfaces (APIs) that can be used for transferring packets between layers.

In one embodiment, intermediate driver 210 may allocate the receive queues associated with each of network interfaces 140-0 to 140-N for use by any of the network interfaces 140-0 to 140-N so that network interfaces 140-0 to 140-N appear as a single virtual network interface with multiple receive queues to layers above intermediate driver 210 such as but not limited to OS 208 and TCBs 212-0 to 212-Y. For example, for two network interfaces with two receive queues each, intermediate driver 210 provides a single virtual network interface with four receive queues (e.g., four input and four output receive queues). In one embodiment, intermediate driver 210 may allocate each return descriptor for completion among a selected output receive queue among multiple output receive queues based on factors such as, but not limited to, fault tolerance, link aggregation, and load balancing of output receive queue utilization. Where multiple network interfaces such as network interfaces 140-0 to 140-N are used, intermediate driver 210 allows taking advantage of features of OS 208 of directing packets for processing by a specific processor even when the device driver for one or any of network interfaces 140-0 to 140-N do not support use of multiple receive queues.

In one embodiment, intermediate driver 210 may determine which of processors 110-0 to 110-N is to process each ingress packet and provide the ingress packet into the appropriate TCB queue among TCB queues 214, in accordance with an embodiment of the present invention.

In addition to or as an alternative to providing load balancing of packet processing by processors 110-0 to 110-N, intermediate driver 210 may provide for load balancing of traffic received from a network 150 by network interfaces 140-0 to 140-N. In one embodiment, intermediate driver 210 may provide for load balancing of traffic received from a network 150 among network interfaces 140-0 to 140-N. For example, in one embodiment, intermediate driver 210 may include the capability to alter "ARP replies" (described in Ethernet standards) to request that traffic from a source device is thereafter addressed to a particular network interface among network interfaces 140-0 to 140-N for load balancing of packets received among network interfaces 140-0 to 140-N. Accordingly, packets thereafter may be transmitted from a source node to the selected network interface among network interfaces 140-0 to 140-N so that load balancing may take place among network interfaces 140-0 to 140-N. For example, intermediate driver 210 may use ARP replies to allocate a first connection for receipt at a first network interface and a second connection for receipt at a second network interface.

Each of TCB queues 214-0 to 214-Y may be associated with respective TCBs 212-0 to 212-Y and allocated for storing (or for associating with) descriptors of packets to be processed by an associated TCB. Each of TCBs 212-0 to 212-Y may perform processing on ingress packets allocated in an associated TCB queue in TCB queues 214-0 to 214-Y in conformance with TCP/IP protocol processing. Further details of the TCP/IP protocol are described in the publication entitled "Transmission Control Protocol: DARPA Internet Program Protocol Specification," prepared for the Defense Advanced Projects Research Agency (RFC 793, published September 1981). Any of processors 110-0 to 110-N may execute any number of TCBs 212-0 to 212-Y. TCBs 212-0 to 212-Y and TCB queues 214-0 to 214-Y can be allocated for each processor at system initialization or during run-time. For example, a new TCB and corresponding TCB queue can be allocated each time a connection is established, such as for a when an application opens or a new file transfer operation.

Applications 216 can be one or more machine executable programs that access data from host system 102 or network 150. An application 216 may include, for example, a web browser, an email serving application, a file serving application, or a database application.

The machine-executable instructions depicted in FIG. 2 may be implemented as any or a combination of: hardwired logic, software stored by a memory device and executed by a microprocessor, firmware, an application specific integrated circuit (ASIC), and/or a field programmable gate array (FPGA).

Figure 3:
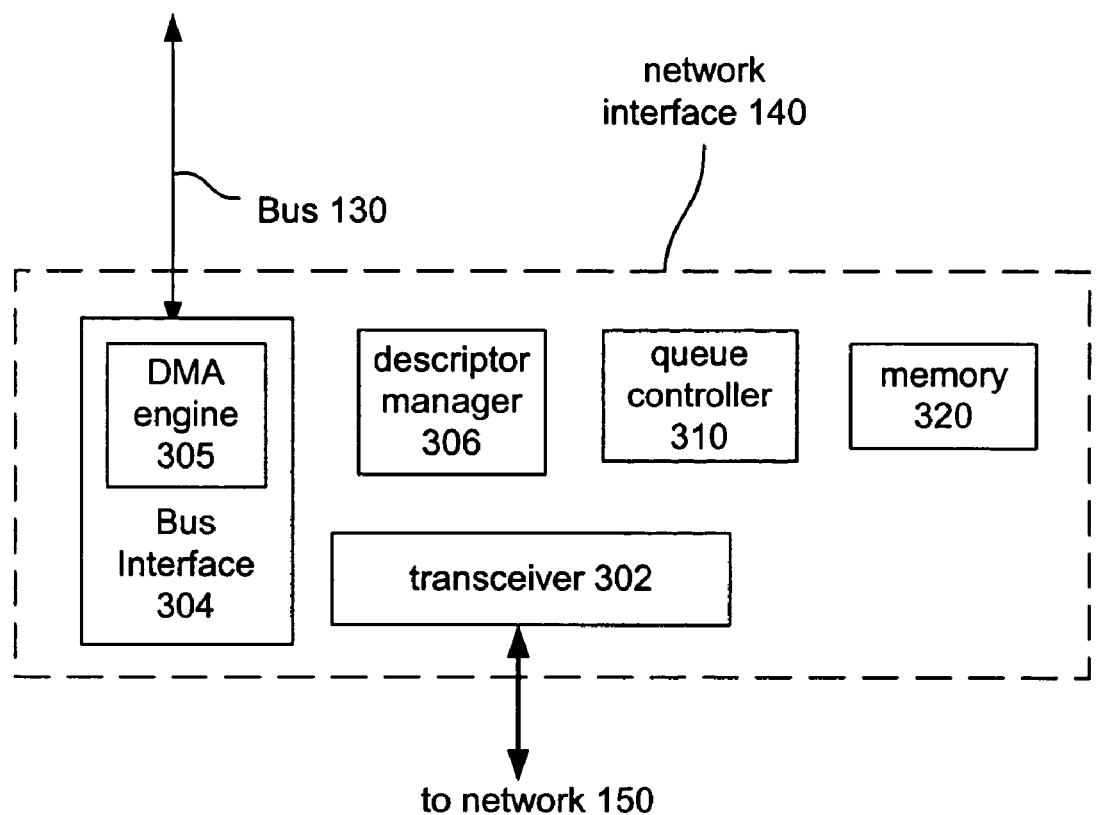
FIG. 3 depicts one possible embodiment of a network interface in accordance with an embodiment of the present invention.

FIG. 3 depicts one possible embodiment of any of network interfaces 140-0 to 140-N in accordance with an embodiment of the present invention, although other embodiments may be used. For example, another embodiment of each of network interfaces 140-0 to 140-N may include, but is not limited to, LAN on motherboard embodiments. Hereafter, network interface 140 refers to any of network interfaces 140-0 to 140-N. For example, one embodiment of network interface 140 may include transceiver 302, bus interface 304, descriptor manager 306, queue controller 310, and memory 320.

Transceiver 302 may include a media access controller (MAC) and a physical layer interface (both not depicted) capable of receiving and transmitting packets in conformance with the applicable protocols such as Ethernet as described in IEEE 802.3, although other protocols may be used. Transceiver 302 may receive and transmit packets from and to network 150 via a network medium.

Bus interface 304 may provide intercommunication between network interface 140 and bus 130. Bus interface 304 may be implemented as a PCI, PCI Express, PCI-x, serial ATA, and/or USB compatible interface (although other interconnection standards may be used). For example, bus interface 304 may include and utilize a direct memory access (DMA) engine 305 to perform direct memory accesses from and into host memory 118 and/or host storage 120 of host system 102. For example, DMA engine 305 may perform direct memory accesses to transfer ingress packets into a buffer in packet buffer 202.

Descriptor manager 306 may initiate access of descriptors from an input queue of the receive queue. In one embodiment, where there are multiple network interfaces 140-0 to 140-N, intermediate driver 210 may allocate the input receive queues associated with each of network interfaces 140-0 to 140-N for use by any of the network interfaces 140-0 to 140-N. For example, descriptor manager 306 may inform DMA engine 305 to read a descriptor from a selected input queue of receive queue 206 and store the descriptor. Descriptor manager 306 may store descriptors that describe candidate buffers in packet buffer 208 that network interface 140 can use to store ingress packets.

Queue controller 310 may determine a buffer of packet buffer 208 to store at least one ingress packet. In one embodiment, based on the descriptors in descriptor storage 208, queue controller 310 may create a return descriptor that describes a buffer to store an ingress packet. Return descriptors may be allocated for transfer to host system 102 using an output queue. In one embodiment, where there are multiple network interfaces 140-0 to 140-N, intermediate driver 210 may allocate the output receive queues associated with each of network interfaces 140-0 to 140-N for use by any of the network interfaces 140-0 to 140-N. In one embodiment, intermediate driver 210 may allocate each return descriptor for completion among a selected output receive queue among multiple output receive queues based on factors such as, but not limited to, fault tolerance, link aggregation, and load balancing of output receive queue utilization. Queue controller 310 may instruct DMA engine 305 to transfer each ingress packet into a buffer in packet buffer 202 identified by a return descriptor. For example, queue controller 310 may place the return descriptor in an output queue and provide an interrupt to inform host system 102 that an ingress packet is stored as described by the return descriptor in the output queue.

Memory 320 may be implemented as a volatile memory device (e.g., RAM, DRAM, or SRAM). Memory 320 may provide buffering and storage for information leaving and entering network interface 140 such as, but not limited to, descriptors and packets.

Network interface 140 may be implemented as any or a combination of: hardwired logic, software stored by a memory device and executed by a microprocessor, firmware, an application specific integrated circuit (ASIC), and/or a field programmable gate array (FPGA).

Figure 4:
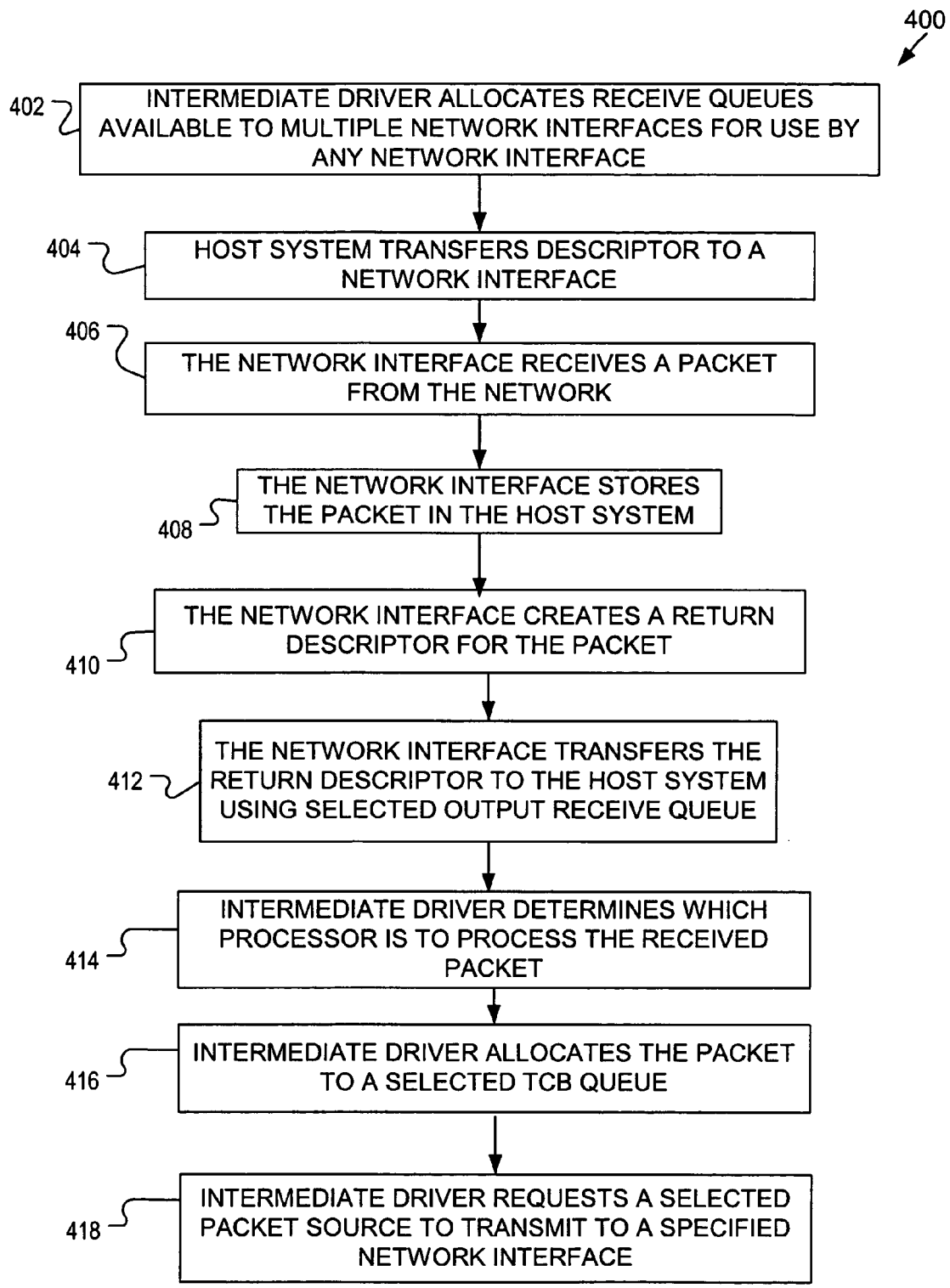
FIG. 4 depicts an example flow diagram that can be used to allocate packets for processing among multiple processors and multiple network interfaces, in accordance with an embodiment of the present invention.

FIG. 4 depicts an example flow diagram that can be used to allocate packets for processing among multiple processors and multiple network interfaces, in accordance with an embodiment of the present invention.

In block 402, intermediate driver 210 may allocate the input and output receive queues associated with each of network interfaces 140-0 to 140-N for use by any of the network interfaces 140-0 to 140-N.

In block 404, device driver 206 may transfer one or more descriptor to a network interface 140. For example, device driver 206 may create one or more descriptors that each describe at least one location in packet buffer 202 in which to store header and payload portions of a packet received from network 150. Descriptors can be placed on the input queue of the receive queues 204 for transfer to a specified network interface 140.

In block 406, a network interface 140 may receive at least one packet from network 150. For example the packet may be compliant with Ethernet format although other formats are permissible.

In block 408, the network interface 140 may store one or more packet payload(s) and header(s) into host system 102. For example, network interface 140 may transfer one or more packet payload(s) and header(s) into host memory 118 based on the packet buffer location in a descriptor(s). For example, queue controller 310 of the network interface 140 may determine which buffer in packet buffer 202 is to store the ingress packet based on available descriptors. For example, based on the determined packet buffer in packet buffers 202, DMA engine 305 of the network interface 140 may transfer the received ingress packet into the packet buffer of packet buffers 202 in host memory 118 (or system memory 120, as the case may be).

In block 410, network interface 140 may create a return descriptor for the packet. For example, the return descriptor may describe the storage location of the packet in packet buffer 202.

In block 412, network interface 140 may transfer the return descriptor to host system 102 using a selected output receive queue among any of the available receive queues of network interfaces 140-0 to 140-N. For example, intermediate driver 210 may select an output receive queue based on factors such as fault tolerance, link aggregation, and load balancing of output receive queue utilization. For example, queue controller 310 of network interface 140 may write the return descriptor to the selected output queue. For example, network interface 140 may notify device driver 206 via an interrupt to request ingress packet processing. Queue controller 310 of network interface 140 can create an interrupt to inform device driver 206 that an ingress packet is stored as described by a return descriptor in the selected output queue.

In block 414, intermediate driver 210 may determine which of processors 110-0 to 110-X is to process the ingress packet. In one embodiment, device driver 206 may issue a request to OS 208 (e.g., deferred procedure call) to notify OS 208 to use intermediate driver 210. Intermediate driver 210 may identify the processor by identifying a TCB queue among TCB queues 214 that is to store (or is to be associated with) the ingress packet. In one embodiment, a specified number of TCB queues among TCB queues 214-0 to 214-Y are associated with each processor. In one embodiment, two TCB queues are allocated to store (or be associated with) packets to be processed by each processor, although other numbers of TCB queues may be used. In one embodiment, to associate a packet with the processor, intermediate driver 210 may determine a hash value using hashing control 211 based on packet header information and may utilize a table which associates TCB queues with hash values. The hash value may be calculated using connection-specific information in each incoming packet header (e.g., for TCP/IP packets, N tuple information such as packet source IP address, destination IP address, source port, destination port and protocol may be used). For example, the table may associate hash values with TCB queues based on an "unload analysis". For example, the unload analysis may consider which processor is least busy by considering the fullness of associated TCB queues as well as other factors such as processor utilization.

In block 416, intermediate driver 210 may allocate the packet into the selected TCB queue among TCB queues 214-0 to 214-Y. In one embodiment, allocating the packet may include passing to the appropriate TCB queue a pointer that identifies the packet descriptor or packet buffer. Thereafter, a packet is available in a TCB queue for processing at least in compliance with TCP/IP.

In one embodiment, each TCB queue is associated with a TCB among TCBs 212-0 to 212-Y and a TCB associated with a TCB queue processes packets in an associated TCB queue in a first-in-first-processed manner. Thereafter, a TCB may perform packet header processing to determine the protocol context associated with the current connection and TCP protocol compliance. TCP protocol compliance may comprise, for example, verifying the sequence number of an ingress packet to ensure that the packet is within a range of numbers that was agreed upon between the communicating nodes; verifying the payload size to ensure that the packet is within a range of sizes that was agreed upon between the communicating nodes; ensuring that the header structure conforms to the protocol; and ensuring that the timestamps are within an expected time range. After processing, the TCP stack may provide the data portion of the packet to the associated application(s) among applications 216.

In action 418, intermediate driver 210 may issue a request to a source of any packet to transmit future packet(s) to a specified network interface among network interfaces 140-0 to 140-N. For example, in one embodiment, intermediate driver 210 may include capability to alter "ARP replies" (described in Ethernet standards) to request that traffic from a source device is thereafter addressed to a particular network interface among network interfaces 140-0 to 140-N for load balancing of packets received among network interfaces 140-0 to 140-N. Accordingly, packets thereafter may be transmitted from a source node in the network 150 to the selected network interface among network interfaces 140-0 to 140-N so that traffic received from a network 150 may be balanced among network interfaces 140-0 to 140-N.

Figure 5:
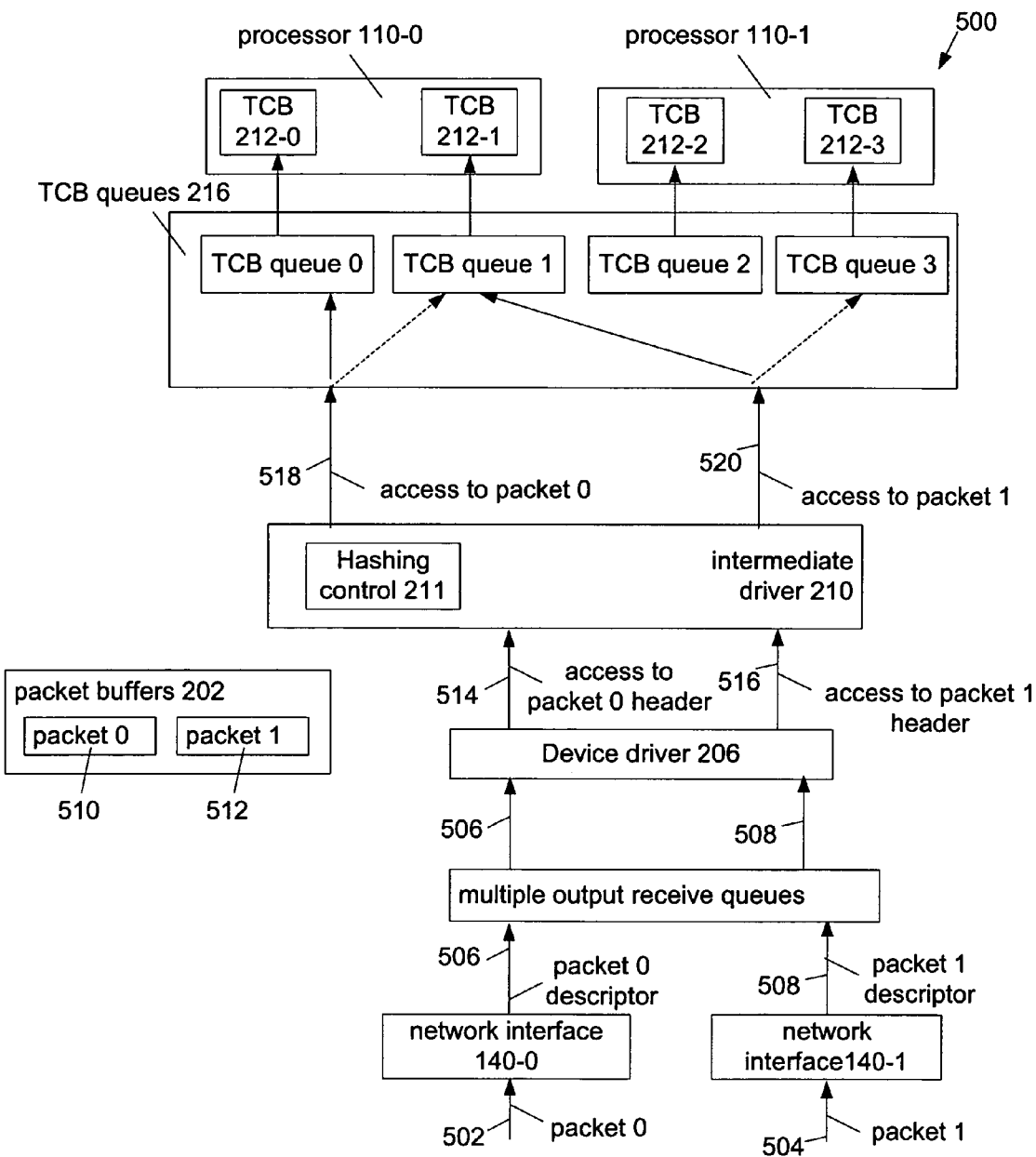
FIG. 5 depicts an example operation of a processor queue allocation technique, in accordance with an embodiment of the present invention.

FIG. 5 depicts in example 500 an example operation of a processor queue allocation technique whereby packets from network interfaces 140-0 and 140-1 are transferred for processing among TCBs 0 to 3 in accordance with an embodiment of the present invention.

At 502 and 504, network interfaces 140-0 and 140-1 may receive respective packets 0 and 1. At 506 and 508, network interfaces 140-0 and 140-1 may provide descriptors for respective packets 0 and 1 to host system 102 using assigned output receive queues among multiple output receive queues and transfer access to such descriptors to device driver 206. At 510 and 512, network interfaces 140-0 and 140-1 may transfer packets 0 and 1 for storage into packet buffers 202. At 514 and 516, device driver 206 may transfer access to headers for respective packets 0 and 1 to intermediate driver 210.

At 518 and 520, intermediate driver 210 may transfer access to packets 0 and 1 to the appropriate TCB queues among TCB queues 216 determined using hash control 211. For example, intermediate driver 210 may assign packets for access by any of TCB queues 0 to 3 based at least on an unload analysis. In this example, packet 0 may be assigned to TCB queue 0 whereas packet 1 may be assigned to TCB queue 1, however packets 0 and 1 may be assigned to other TCB queues among those depicted as well as not depicted. For example, in another assignment, packet 0 may be assigned to TCB queue 1 whereas packet 1 may be assigned to TCB queue 3.

The drawings and the forgoing description gave examples of the present invention. While a demarcation between operations of elements in examples herein is provided, operations of one element may be performed by one or more other elements. The scope of the present invention, however, is by no means limited by these specific examples. Numerous variations, whether explicitly given in the specification or not, such as differences in structure, dimension, and use of material, are possible. For example, "packet" may include information encapsulated according to any protocols. The scope of the invention is at least as broad as given by the following claims.

What is claimed is:

1. A method comprising:
   receiving, at a host system having receive queues, packets from a plurality of network interfaces, each of the network interfaces associated with at least one receive queue from the receive queues, wherein the plurality of network interfaces are capable to use any of the receive queues;
   providing availability of a plurality of processors for packet processing; and
   providing allocation of packet processing among the plurality of processors based on a table which associates one or more of the receive queues with a processor of the plurality of processors based on a hash value, wherein the hash value corresponding to the processor is to be determined based on connection-specific information in a header of each of the packets, wherein the processor queues are to store the packets from the receive queues, wherein the table is to associate hash values with the receive queues based on an unload analysis, wherein the unload analysis is to consider which processor from the plurality of processors is least busy based on: fullness of the one or more receive queues associated with the processor and processor utilization.

2. The method of claim 1, wherein the providing allocation comprises:
   associating at least one TCP processing block for execution by each processor among the plurality of processors;
   associating at least one queue with each TCP processing block; and
   allocating each of the packets for processing by a selected TCP processing block.

3. The method of claim 2, wherein the allocating each of the packets for processing by a selected TCP processing block comprises:
   determining a hash value for each packet based on processing of a header associated with each packet; and
   selecting a queue based on the hash value.

4. The method of claim 1, further comprising:
   providing load balancing of use of output receive queues by the plurality of network interfaces.

5. The method of claim 1, further comprising:
   providing traffic balancing of packets capable of being received by the plurality of network interfaces.

6. The method of claim 5, wherein the providing traffic balancing comprises:
   generating a request to a node capable of transmitting packets, wherein the request includes a request to transmit a packet to a specified network interface.

7. The method of claim 1, further comprising:
   providing interaction with the plurality of network interfaces as a single network interface with a plurality of receive queues.

8. The method of claim 1, wherein the connection-specific information is to comprise N tuple information and wherein the N tuple information is to consist of: a packet source IP address, a destination IP address, a source port, a destination port, and a protocol to be used.

9. An apparatus comprising:
   a memory to receive packets, wherein the packets are provided by a plurality of network interfaces;
   a plurality of processors; and
   an intermediate driver to:
      provide capability to the plurality of network interfaces to use receive queues associated with any of the network interfaces; and provide allocation of packet processing among the plurality of processors based on a table which associates one or more of the receive queues with a processor of the plurality of processors based on a hash value, wherein the hash value corresponding to the processor is to be determined based on connection-specific information in a header of each of the packets, wherein the processor queues are to store the packets from the receive queues, wherein the table is to associate hash values with the receive queues based on an unload analysis, wherein the unload analysis is to consider which processor from the plurality of processors is least busy based on: fullness of the one or more receive queues associated with the processor and processor utilization.

10. The apparatus of claim 9, wherein to provide allocation, the intermediate driver is to:
associate at least one TCP processing block for execution by each processor among the plurality of processors;
associate at least one queue with each TCP processing block; and
associate each of the packets for processing by a selected TCP processing block.

11. The apparatus of claim 10, wherein to associate each of the packets for processing by a selected TCP processing block, the intermediate driver is to:
determine a hash value for each packet based on processing of a header associated with each packet; and
select a queue based on the hash value.

12. The apparatus of claim 9, wherein to provide capability to the plurality of network interfaces to use receive queues associated with any of the network interfaces, the intermediate driver is to:
provide load balancing of use of output receive queues by the plurality of network interfaces.

13. The apparatus of claim 9, wherein the intermediate driver is further to:
provide traffic balancing of packets capable of being received by the plurality of network interfaces.

14. The apparatus of claim 13, wherein to provide traffic balancing of packets capable of being received by the plurality of network interfaces, the intermediate driver is to:
generate a request to a node capable of transmitting packets, wherein the request includes a request to transmit a packet to a specified network interface.

15. The apparatus of claim 9, wherein the connection-specific information is to comprise N tuple information and wherein the N tuple information is to consist of: a packet source IP address, a destination IP address, a source port, a destination port, and a protocol to be used.

16. A computer-readable medium comprising instructions stored thereon which when executed by a machine cause the machine to:
provide availability of a plurality of processors for packet processing;
provide capability to a plurality of network interfaces to use receive queues associated with any of the network interfaces; and
provide allocation of packet processing among the plurality of processors based on a table which associates one or more of the receive queues with a processor of the plurality of processors based on a hash value, wherein the hash value corresponding to the processor is to be determined based on connection-specific information in a header of each of the packets, wherein the processor queues are to store the packets from the receive queues, wherein the table is to associate hash values with the receive queues based on an unload analysis, wherein the unload analysis is to consider which processor from the plurality of processors is least busy based on: fullness of the one or more receive queues associated with the processor and processor utilization.

17. The computer-readable medium of claim 16, wherein to provide allocation of packet processing among the plurality of processors, the instructions are to:
associate at least one TCP processing block for execution by each processor among the plurality of processors;
associate at least one queue with each TCP processing block; and
associate each of the packets for processing by a selected TCP processing block.

18. The computer-readable medium of claim 17, wherein to associate each of the packets for processing by a selected TCP processing block, the instructions are to:
determine a hash value for each packet based on processing of a header associated with each packet; and
select a queue based on the hash value.

19. The computer-readable medium of claim 16, wherein the connection-specific information is to comprise N tuple information and wherein the N tuple information is to consist of: a packet source IP address, a destination IP address, a source port, a destination port, and a protocol to be used.

20. A system comprising:
a computing platform including a plurality of processors and a memory device;
a plurality of network interfaces, each capable to transfer a packet into a payload buffer stored in the memory device;
a bus capable of providing intercommunication between the computing platform and the plurality of network interfaces; and
code that is capable of causing any of the processors to be operable to:
provide capability to the plurality of network interfaces to use any receive queue associated with any of the plurality of network interfaces; and
provide allocation of packet processing among the plurality of processors
based on a table which associates one or more of the receive queues with a processor of the plurality of processors based on a hash value, wherein the hash value corresponding to the processor is to be determined based on connection-specific information in a header of each of the packets, wherein the processor queues are to store the packets from the receive queues, wherein the table is to associate hash values with the receive queues based on an unload analysis, wherein the unload analysis is to consider which processor from the plurality of processors is least busy based on: fullness of the one or more receive queues associated with the processor and processor utilization.

21. The system of claim 20, wherein the bus is compatible with PCI express.

22. The system of claim 20, wherein the bus is compatible with PCI.

23. The system of claim 20, wherein the computing platform further includes a bus interface communicatively coupled to the bus.

24. The system of claim 20, further including a second memory device communicatively coupled to the bus.

25. The system of claim 20, wherein the connection-specific information is to comprise N tuple information and wherein the N tuple information is to consist of: a packet source IP address, a destination IP address, a source port, a destination port, and a protocol to be used.

* * * * *